Figure 1:
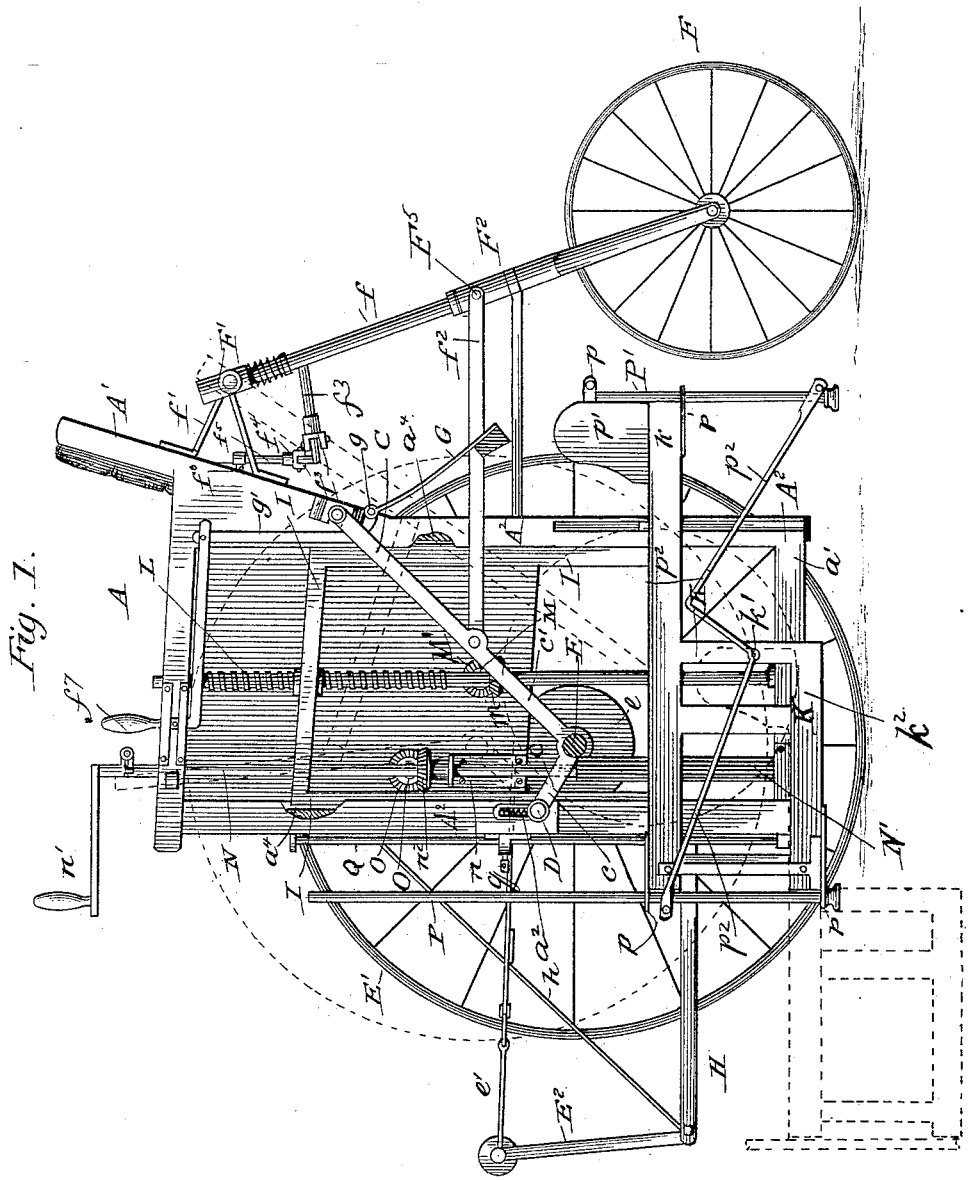

(No Model.) 4 Sheets—Sheet 1.

J. B. BRAY.
STAIR CLIMBING PERAMBULATING CHAIR.

No. 468,022. Patented Feb. 2, 1892.

Witnesses
Norris A. Clark
A. B. Lovejoy

Inventor
James B. Bray
By [signature]
Attorney

THE NORRIS PETERS CO., PHOTO-LITHO., WASHINGTON, D. C.

(No Model.) 4 Sheets—Sheet 2.
J. B. BRAY.
STAIR CLIMBING PERAMBULATING CHAIR.
No. 468,022. Patented Feb. 2, 1892.
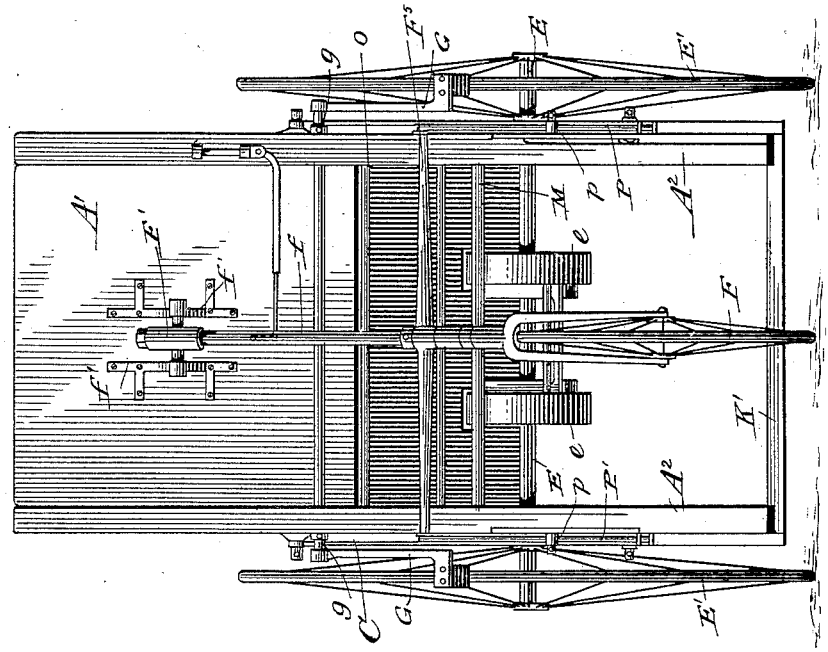
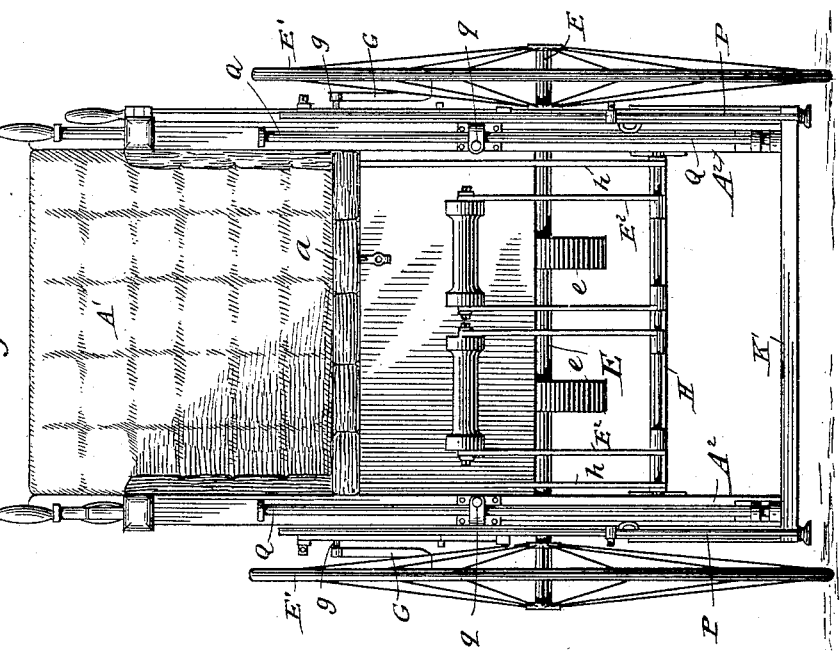

(No Model.) 4 Sheets—Sheet 3.
J. B. BRAY.
STAIR CLIMBING PERAMBULATING CHAIR.
No. 468,022. Patented Feb. 2, 1892.
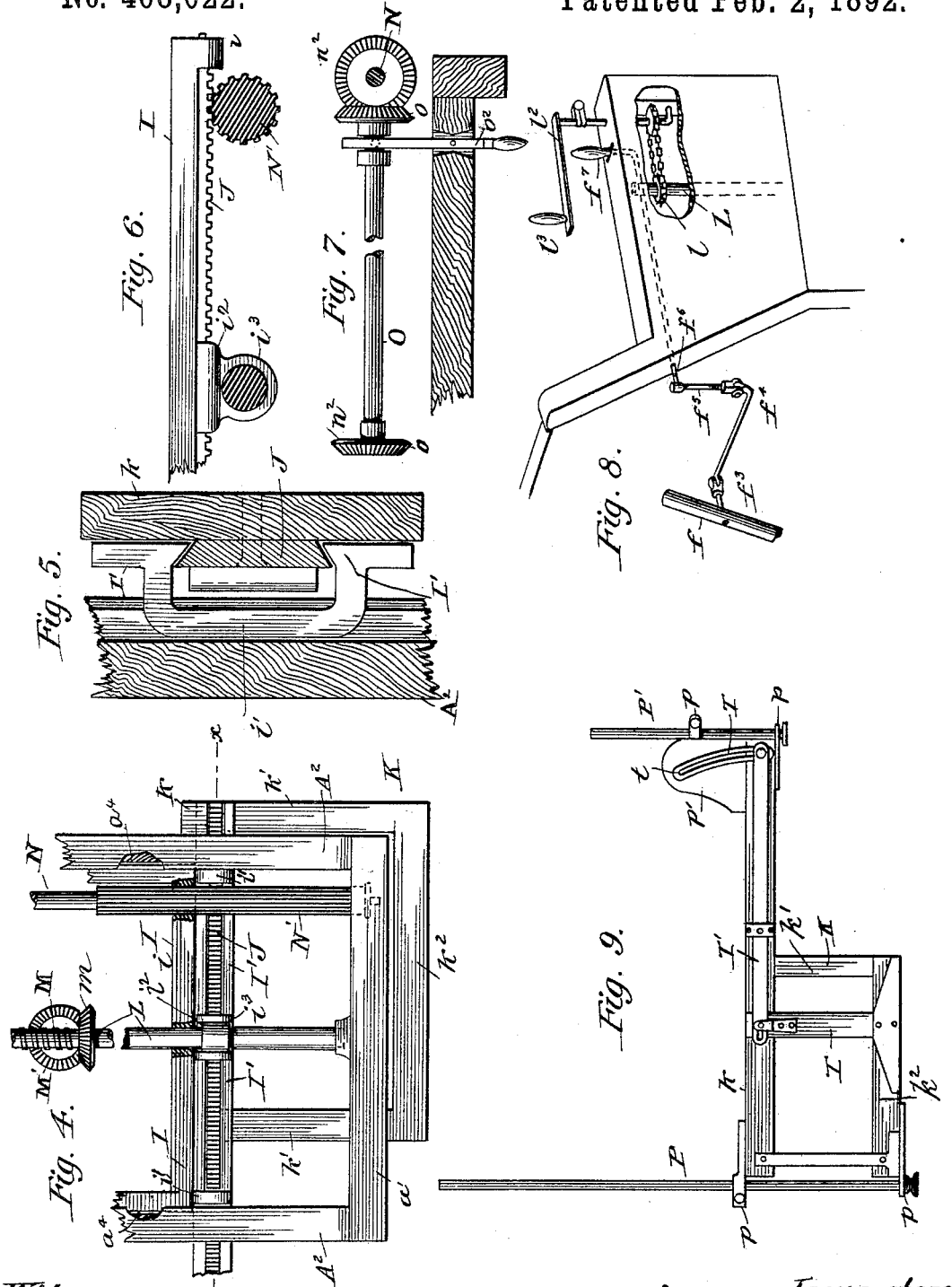
Witnesses.
Norris L. Clark
A. B. Lovejoy.
Inventor
James B. Bray
By [signature]
Attorney (No Model.) 4 Sheets—Sheet 4.
J. B. BRAY.
STAIR CLIMBING PERAMBULATING CHAIR.
No. 468,022. Patented Feb. 2, 1892.
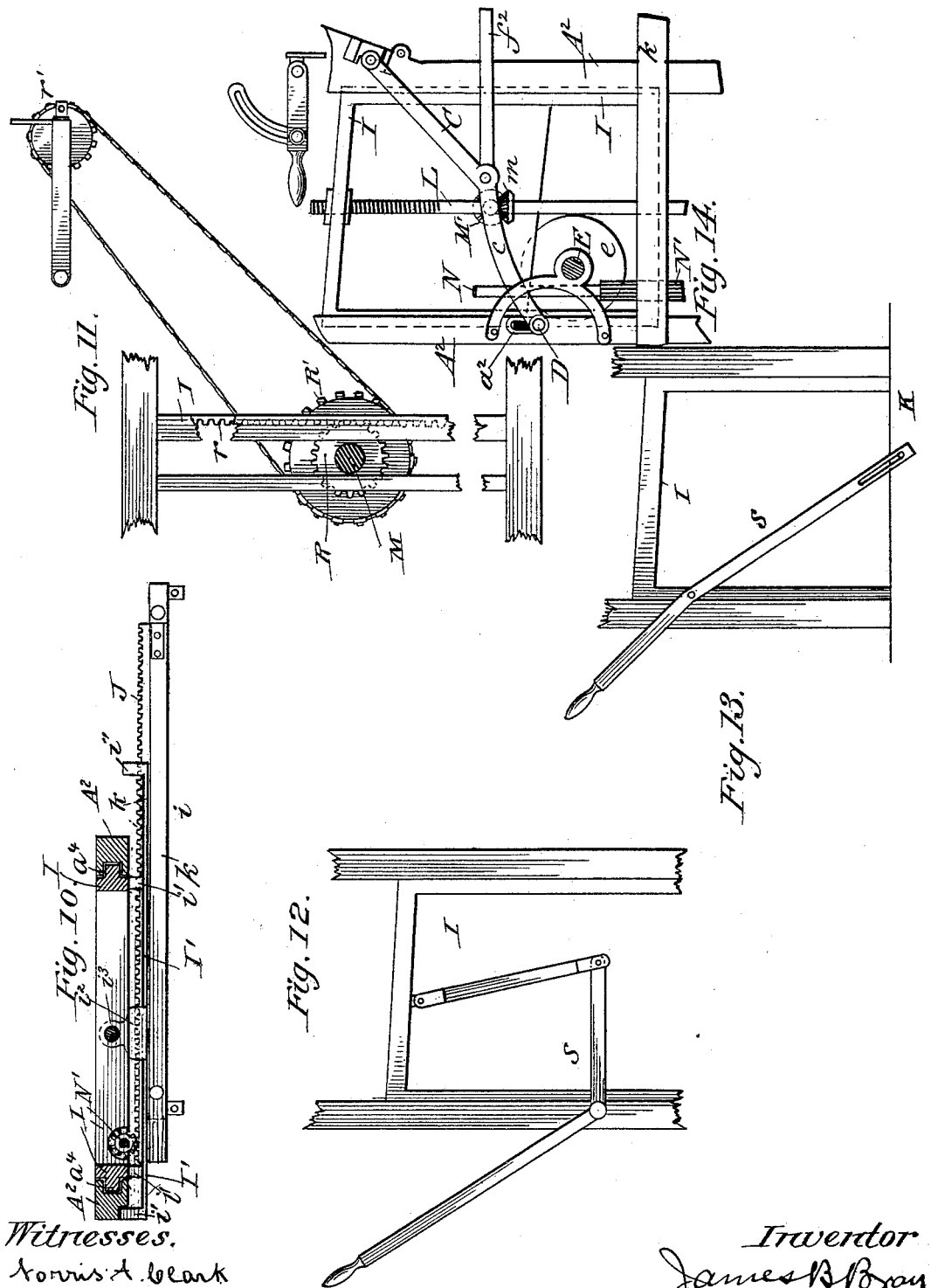

UNITED STATES PATENT OFFICE.

JAMES B. BRAY, OF WAVERLY, NEW YORK.

STAIR-CLIMBING PERAMBULATING-CHAIR.

SPECIFICATION forming part of Letters Patent No. 468,022, dated February 2, 1892.

Application filed August 8, 1887. Serial No. 246,456. (No model.)

*To all whom it may concern:*

Be it known that I, JAMES B. BRAY, a citizen of the United States, residing at Waverly, in the county of Tioga and State of New York, have invented certain new and useful Improvements in Stair-Climbing Perambulating Invalid-Chairs; and I do hereby declare the following to be a full, clear, and exact description of the invention, such as will enable others skilled in the art to which it appertains to make and use the same.

Figure 1 is a side elevation of my improved stair-climbing perambulating invalid-chair, showing the parts adjusted to make it a wheel or perambulating chair, with the facing driving-wheel removed. Fig. 2 is a front view of the same. Fig. 3 is a rear view. Fig. 4 is a detail partly sectional view looking outwardly from the inside of the chair, showing the arrangement of and mechanism for adjusting the movable frames. Fig. 5 is a sectional detail through the rack of the frames, showing its connections. Fig. 6 is a sectional view of Fig. 4 on line $xx$ thereon. Figs. 7, 8, 9, and 10 are details. Figs. 11, 12, and 13 are detail views showing modifications of the operative mechanisms of the step-frames, and Fig. 14 represents a modification of the levers to swing the rear wheel inward under the seat.

This invention relates to improvements in invalid-chairs; and it has for its objects to provide a perambulating wheel-chair for both indoor and outdoor use and in which the occupant can convey himself up or down stairs without the assistance of others at pleasure, it being adjustable to widths and heights of steps.

To these ends the invention consists in the peculiar and novel construction and arrangement of the various parts of the chair for effecting the stair-climbing and in certain other details of construction hereinafter described, illustrated in the drawings, and particularly specified in the appended claims.

Referring to the drawings by letter, A designates the body of the chair, which is of ordinary form, having a back A', seat $a$, Fig. 2, and legs $A^2$, the legs, front, and back on each side of the chair being connected and braced by horizontal bars $a'$ at their lower ends, so that a firm support will be afforded to the chair when set upon the stair-steps and also for supporting pinion-shaft M' and screw-shaft L.

C C designate cranked levers on opposite sides of the chair, pivoted by and connected rigidly to the ends of a horizontal rod D by means of their short arms $c$, as shown in Fig. 1. Fig. 14 shows a modified form of the arms $c$. The rod D is journaled in slots $a^2$, formed in the front legs of the chair just below the seat, and the upper ends of the slots $a^2$ are provided with coiled springs to prevent jar when the rod D rises in the slots. From their connections with rod D the arms $c$ of the lever extend downwardly and inwardly a short distance and connect with the long arms $c'$ of the levers, which latter extend upwardly and rearwardly to the back of the chair and can be grasped by a person therein. The upper ends of the arms $c'$ are arranged to engage, when drawn rearward, in catches or clasps secured to the edge of the chair to hold the levers C in the position shown in Fig. 1. At the junction of arms $c$ $c'$ of levers C are formed the bearings of the horizontal shaft E, which may be rigidly secured to these levers and which bears on its extended ends the supporting and operating wheels E', as shown.

F designates the rear guide-wheel of the chair, which is mounted in the lower bifurcated end of a rod $f$, the upper end of which is journaled and provided with a spiral spring surrounding the journal and placed between the lower shoulder of the journal and the swinging collar F', hung between bracket-pieces $f'$, secured to the back A' of the chair, as shown in Fig. 3.

Near the bifurcation of rod $f$ is secured between suitable collars a sleeve $F^2$, Fig. 1, having outwardly-extending opposite horizontal arms $F^5$, Fig. 3, which extend beyond the sides of the chair a proper distance and have pivoted to their ends the rear ends of bars $f^2$, Fig. 1, which extend forward to the levers C and are pivotally connected to about the center of the arms $c'$ of said levers.

In order to shift or turn wheel F to guide the chair, I employ the device shown in Fig. 8. This consists of a short arm $f^3$, rigidly connected near the upper end to rod $f$ and standing in the same line as the plane of the wheel F. To the outer end of arm $f^3$ is connected one end of a knuckle-joint rod $f^4$, the other end of which is similarly connected to a vertical arm $f^5$, which is rigidly connected to or formed integral with a rod $f^6$, which is journaled in one arm of the chair and extends forward to a suitable point of the same, where it is provided with a vertical crank-handle $f^7$, rising through a suitable slot in the arm of the chair, so that the rod $f^6$ can be rotated thereby, and, through its connections, cause the shifting of wheel F, as is evident.

G designates brake-arms of ordinary construction, mounted on a horizontal rod $g$, which is operated by a suitable lever $g'$, situated in convenient position for use by the occupant, as usual.

H designates the foot-rest, which is of ordinary construction and which, when opened, is held horizontal or in other position by means of the rods or chains $h$, connected to its outer edge and to suitable points of the chair, as shown in Fig. 1.

When it is desired to work the chair by pedals instead of by hand, the shaft or axle E is loosely journaled in levers C, as described, the wheels E' being fixed thereon, and at suitable points on the shaft are fixed drums $e$, which are connected by suitable straps $e'$ with vibrating pedals $E^2$, pivoted to the foot-rest H, as shown; but this operating mechanism is fully shown and described in my former patent, No. 256,633, and is not herein claimed, it forming no part of the present invention.

The pairs of legs $A^2$ on the sides of the chair are provided on their inner faces with vertical grooves $a^4$, Fig. 1, (also see Fig. 10, $A^2$, for detailed view,) in which are fitted and move vertically the rectangular frames I I on opposite sides of the chair. To the bottom pieces $i\ i$ of frames I are secured the metallic ways I', Figs. 5, 6, and 10, which extend horizontally across the frames, between legs $A^2$, Fig. 4, and which ways are of such depth as to project beyond the exterior surfaces of legs $A^2$ of the chair. The flanged edges of ways I' are strengthened and united at their ends by the loops or bridges $i'\ i'$, Figs. 5, 6, and 10, and at their centers by a bracket-loop $i^2$, Figs. 4 and 6, which has an outstanding perforated lug $i^3$, as shown in Figs. 4 and 6.

Within ways I', Figs. 5 and 6, fit and move the racks J J, toothed on their interior sides, Figs. 4, 5, and 6, which are rigidly secured to the upper rails $k$ of frames K, Figs. 1, 4, 5, and 9, which are the step-frames of the chair and are situated outside of legs $A^2$ and frame-ways I' on the sides of the chair. The rack-bars J and rails $k$, Figs. 4 and 5, may be made separate or integral, as may be desired. The lower rail $k^2$, Fig. 4, however, of the frame K is not quite as long as the width of the side of the chair, while the racks J and extended bar $k$ of frame K are about one-third longer than the width of the chair from front to back, being extended in rear of frames K, as shown in Fig. 9. The frames K K are rectangular and are composed, preferably, of side pieces $k'\ k'$, top rail $k$, and bottom rail $k^2$, Figs. 4 and 9, and the frames are made to correspond with or adjustable to the average depth and width of stair-steps or to any required size. The front lower edges of frames K are preferably rigidly connected by a cross-bar K' in single-action chairs designed for straight stairways, Figs. 2 and 3, so that their motions will be equalized; but the cross-bar K' is not employed in chairs designed for spiral or curved stairways, where it is desirable that each of the frames K should be capable of separate or independent action.

L designates vertical screw-threaded shafts situated one on each side of the chair, centrally of its width, and properly journaled at top and bottom upon the main frame A, as shown in Fig. 1. The shaft L passes through the upper and lower rails of frame I, and its threads engage corresponding female threads formed in or secured to frame I, as shown in Fig. 1, so that the rotation of the shafts L will cause the lifting or lowering of frames I, and with them frames K, as is evident.

Motion may be imparted to shafts L in any suitable manner, preferably as shown in Fig. 8, in which a sprocket-wheel $l$ is mounted on the upper end of shaft L, inside the arm of the chair, and driven by a suitable chain or gears from a similar wheel on a crank-arm $l^2$, suitably journaled in the arm of the chair-frame and having a handle $l^3$, by which it can be operated by the occupant. To make the movements of shafts L and frames I and K synchronous and equal, I employ the horizontal shaft M, Figs. 1, 4 and 11, mounted in suitable bearings in frame A, below seat $a$, and extending between the shafts L, Figs. 1 and 4.

M' designates bevel-gears secured on the ends of shaft M, Figs. 1 and 4, and engaging corresponding gears $m$, Fig. 4, fixed on shafts L, so that when one shaft is rotated it will, through its gears and shaft M, impart a corresponding degree of movement to the opposite shaft L, as is evident, rendering the use of actuating mechanism, as described, for one shaft L only necessary.

N N, Figs. 1 and 4, designate vertical shafts parallel with but in front of shafts L L and similarly journaled in the frame A and in brackets $n$, secured to the sides of the chair about centrally of the height thereof. One or both of shafts N may be provided with a handle $n'$, Fig. 1, at its upper end for rotating the same, or other suitable actuating devices may be employed.

O, Fig. 7, designates a horizontal shaft lying between shafts N N, Figs. 1, 4, and 7, below seat $a$, and suitably journaled in the main frame of the chair.

$o\ o$ are bevel-gears on the ends of shaft O, Figs. 1 and 7, which engage corresponding gears $n^2$ on the shafts N, so that the shafts will be rotated simultaneously and equally.

N', Figs. 1, 4, and 6, designate gears on the lower ends of shafts N, which engage the teeth of racks J, Figs. 4, 5, 6, and 10, and actuate the latter, and consequently the step-frames K, as evident. The gears N' are of such length or height that they will engage racks J at any point of vertical movement of the latter caused by the lifting or lowering of frames I by shafts L, as described.

P is a vertical adjustable rod or foot secured to the front of frame K by means of suitable eye-straps $p$, Figs. 1 and 9, which may or may not be provided with set-screws for locking the rod, and P' designates a similar but shorter rod secured to the rear end of bar $k$, which is of equal length of rack J, by means of suitable straps $p$, similar to those of rod P, the upper strap, set-screw, or suitable adjustable fastening of rod P' being supported on a vertical bracket $p'$, secured to bar $k$, as shown.

$P^2$ designates double-cranked levers pivoted at their lowest and front angles about centrally on the rear bars $k'$, between rods P P', to which their opposite ends are adjustably secured, as shown in Fig. 1, so that when the rear rod or foot is elevated the other will be depressed, the set-screw at top of rod P' holding rods P P' and lever $P^2$ securely in place when adjusted.

Q Q are rods similar to rods P and adjustably secured by eye-straps and set-screws $q$ or other equivalents to the front legs of the chair, as shown.

In Fig. 11 I show a modification of the means for shifting frame I vertically. In this the shafts L are dispensed with, and the shaft M carries spur-gears R, engaging racks $r$, which are secured to the cross-pieces at top and bottom of the vertical ways of frames I, shaft M being in this case provided with a sprocket-wheel R', driven by a suitable chain from a sprocket on a crank $r'$, suitably located on frame A.

Fig. 12 shows a second modification for operating frame I. In this the screw-shaft and its connections are dispensed with and an angular lever S is employed, pivoted at its bend to the front legs of the chair and securely fastened to a shaft extending to the opposite side of the chair, where it is attached to a similar arm, and having its rear arm connected by a link-bar to the top rail of frame I, so that when its front arm is operated the frames I will be correspondingly raised or lowered on both sides of the chair.

Fig. 13 shows a modification for shifting the step-frame K, the racks and gears being dispensed with, and a crank-lever $s$, pivoted at its bend to the frame I, is used by grasping the upper end of the lever. The frame K is actuated by the lower arm of the same, which engages by a suitable slot a pin on said frame, as shown.

The operation of the chair is as follows: The parts are normally in the position shown in Figs. 1, 2, and 3, the chair being supported on the wheels, so that it is then a perambulator, and the occupant can wheel himself wherever he pleases. Should he wish to ascend a flight of steps, he wheels himself to the bottom step, placing the back of the chair toward the stairs, and then grasps the ends of levers C and lifts these levers until they assume the position shown in dotted lines, Fig. 1; or, if the operator is not strong enough to operate the levers C, he can lower the frames K until they rest on the floor, and then raise the chair so that its wheels are about two inches above the floor, when the levers C can be easily raised, and the chair can then be lowered so that its legs or feet will rest on the floor. This movement causes the axle E and its wheels to be lifted on lowering the chair until it rests on its legs $A^2$, and at the same time pulls wheel F forward and upward beneath the chair-seat, so that the wheels are out of the way and out of use, and the levers C are held in this position by suitable catches, as seen in Fig. 1. The occupant, then, by properly turning shaft L, raises frames I and K until the base of the latter is flush with the top of the first step. He then turns shaft N to cause the frames K to be moved backward until they are properly over the step. He then properly adjusts the rods P and P' to help frame K support the weight of the chair, and then, by turning shafts L in a reverse direction, causes the chair-body to rise, as the frames I and K are held by impinging on the step. When the base of the chair is raised sufficiently to permit it being brought backward on frames I K, the shafts N are properly actuated and the chair moves upon the first step, when the rods Q, Figs. 1 and 2, are adjusted, and the operation of the shafts L and N are repeated until all the stairs are climbed. The rods P' by their bell-crank connection with rods P and base-piece of frame K will exert sufficient pressure on or over said steps to prevent any forward slipping of frames K. The lower rails of these frames may also be faced with rubber to present a firmer hold on the step. The operation is the same where the modifications described are employed. The rods Q on the front of the chair-frame are adjusted to support the front of the chair in the climbing operation, they being extended downward to impinge on the step below the bottom of the chair, supporting the chair on two steps. In descending the stairs the operation is reversed, the chair being taken to the first step and the wheels disengaged, as described. The frames K are run outward until they are over the next lower step. The rods P P' are properly adjusted to support the frames K, the set-screw connections of the rods with their crank-levers permitting their proper relative adjustment. The chair is then moved forward over frames K, and the rods Q on the chair-frame are adjusted and the chair is lowered on the step and the frames are advanced and lowered, as before. The rods Q are adjusted to bind on the step and prevent the accidental tipping forward of the chair and consequent danger to the occupant of upsetting.

In order to allow the chair to be used on spiral stairways, if the shaft O and its gears are to be used for shifting frames K, I spline these gears on the shaft by employing lever-arm $o^2$, Fig. 7, pivoted to the chair-frame and engaging suitable collars fixed to the gear $o$, so that the gear on the inside can be disengaged, so that the frame K on such side will only move the requisite distance. The rods P P' perform a very important office, as they support the frame K, and, together with the frame K, take bearings on three steps at the same time, which would otherwise not have sufficient bearing on the stairs to support the weight of the chair safely.

In Fig. 9 I have shown a supplementary foot for the step-frame, consisting of an inverted-T-shaped foot T, having its stem moving in suitable guides and operated by a slotted lever-arm T', pivoted to the rail $k$ of the frame and having its rear end engaged by a set-screw on an arc-shaped bracket $t$ on the part $P^2$, so that the foot T can be adjusted vertically and different depths of steps accommodated by the frames K.

In Fig. 14 the arms or levers C do not have bearings for the shaft E, which is supported in bearings formed in brackets secured to the front legs $A^2$ of the chair. The said levers consequently cannot raise or lower the side wheels E' on the chair-frame, but can only raise and throw the wheel F under said frame.

Having thus described my invention, what I claim as new, and desire to secure by Letters Patent, is—

1. In a perambulating-chair, the combination, with the body portion supported on wheels mounted on an axle having bearings in bell-crank levers secured to the sides of the chair, the rear guide-wheel mounted on a rod having pivotal bearings between brackets secured to the back of the chair, the braces pivotally connected to the crank-levers on each side of the chair, and means, substantially as shown and described, for holding the levers down, whereby the wheels support the body of the chair, and for raising said levers, whereby the chair is supported on its fixed legs, substantially as specified.

2. The combination, in a stair-climbing chair, of the vertically and the horizontally movable frames on opposite sides of the chair, the former having a pinion carried by a shaft journaled in bearings on the sides of the chair and meshing with a rack on the horizontally-moving frame, and means, substantially as described, for shifting the vertically and horizontally movable frames, for the purpose specified.

3. In a combined perambulating and stair-climbing chair, the combination of the crank-levers having the main axle journaled therein, the rear guide-wheel having its supporting-rod journaled in swinging bearings on the chair-back and in a sleeve connected by arms to the pivoted levers, with the vertically-moving frames and their operating mechanism and the laterally-movable frames secured to the former frames and their actuating mechanism, all constructed, arranged, and operating substantially as described.

4. The combination, with a suitable chair-frame, of two vertically-moving frames I I, having bearings in the opposite side legs of the chair, and two horizontally-movable frames K K, each having an extended upper bar by which it is mounted on one of the frames I, so as to be shifted vertically thereby, and means for shifting frames K laterally independently of frames I, substantially as described.

5. The combination, with chair A, mounted on suitable supporting-wheels and having means for lifting said wheels, so that the chair will rest on its legs, substantially as described, of the vertically-moving frames I, their actuating mechanism, and the longitudinally-moving frames K, having extended upper rail $k$, and their actuating mechanism, and suitable adjustable feet at the ends of frames K, all constructed, arranged, and operating as described.

6. The combination, in a stair-climbing chair, of vertically and horizontally adjustable frames carried by each side of the chair, and means, substantially as shown and described, whereby the frames are caused to raise or lower the chair, for the purpose set forth.

7. The combination, in a stair-climbing chair, of the body portion mounted on wheels secured to an axle having bearings in the frame, the bell-crank levers carried by said axle, the bifurcated rod secured in brackets at the rear of the chair, carrying in its bifurcated portion a guide-wheel, the vertically and horizontally adjustable frames carried by the chair, and means, substantially as shown and described, for raising and lowering the frames and chair, substantially as specified.

8. The combination, with a chair having vertically-grooved side legs, of frames I, moving in said grooves, step-frames K, mounted on frames I, the racks J, secured to the upper rails $k$ of the frame K, the ways I', secured to the frames I and engaging said racks, shafts L and M and their gears for imparting equal movements to frames I and pinion-bearing shafts N, and shafts O and their gearing for imparting equal movements to frames K, all constructed and arranged to operate substantially as specified.

9. The combination of the wheel-axle mounted on bell-crank levers secured at each side of the chair, connected at their front to a rod playing in slots formed in the legs of the chair, the rear guide-rod secured in adjustable swinging bearings on the rear of the chair and having a pivotal connection with the bell-crank levers and frames I on each side of the chair, the vertically and horizontally adjustable frames on each side of the chair, the adjustable foot-rods on said frames, and the foot-rods on the front legs of the chair, all arranged to operate substantially as described.

In testimony whereof I affix my signature in presence of two witnesses.

JAMES B. BRAY.

Witnesses:
GEO. H. GRAFFT,
WM. E. TEW.